United States Patent Office 3,496,708
Patented Feb. 24, 1970

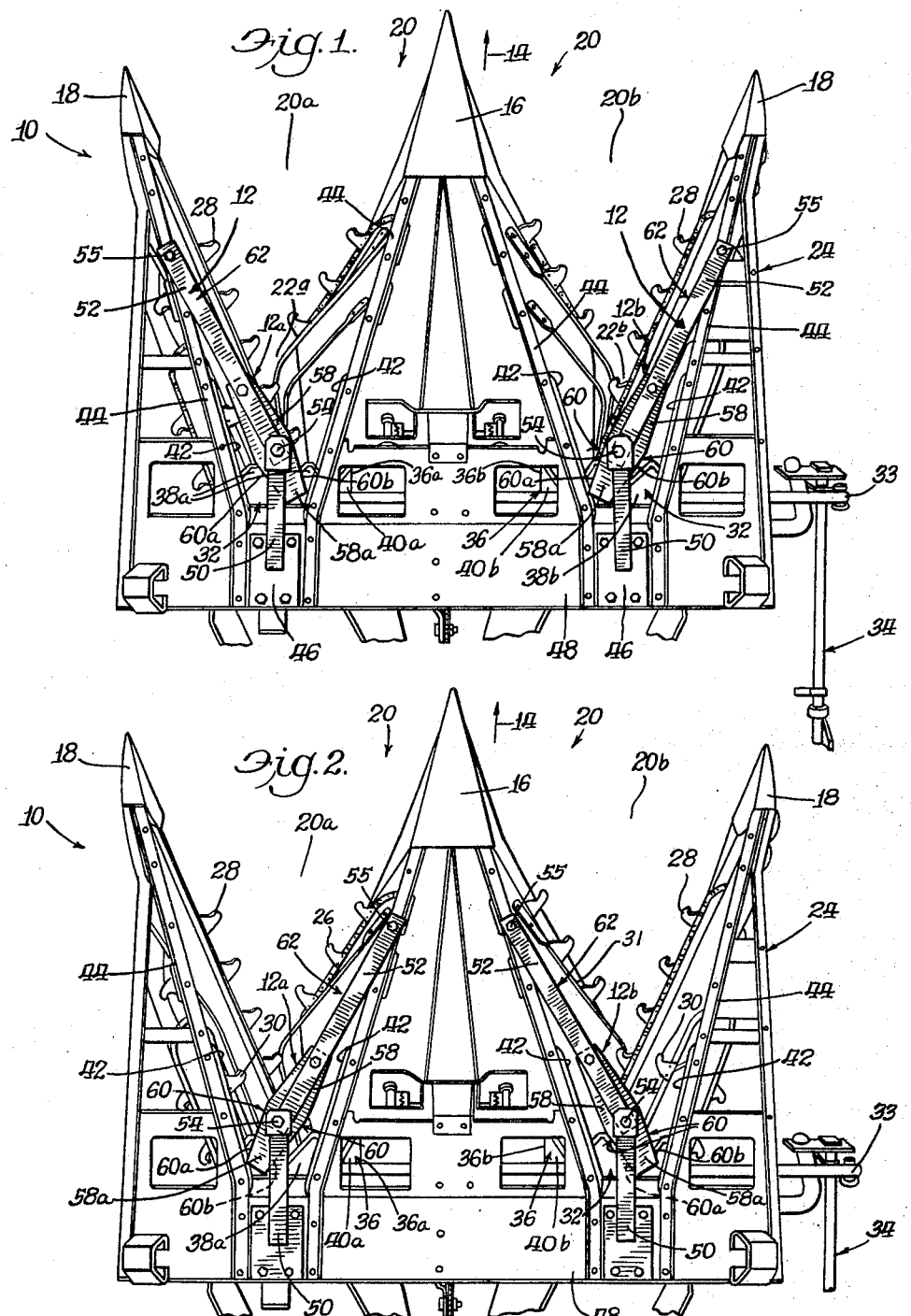

3,496,708
VARIABLE SPACING ROW CROP HARVESTER
James H. Bornzin, La Grange, Ill., assignor to International Harvester Company, Chicago, Ill., a corporation of Delaware
Filed May 28, 1968, Ser. No. 732,741
Int. Cl. A01d 45/02
U.S. Cl. 56—119                                    10 Claims

ABSTRACT OF THE DISCLOSURE

Multiple row harvester having a frame defining fixed passages for the respective crop rows, each passage being of substantial width to accommodate wide variation of spacing of the rows, and a guide in each passage including a mounting section fixed in position and a movable section selectively movable and positionable on opposite sides of that passage, to accommodate lateral positions of the crop plants in the respective passages according to the spacing of the rows.

CROSS REFERENCES

Co-pending application of John J. Kowalik and Ronald F. Zitko, Ser. No. 732,742 filed May 28, 1968, for Variable Spacing Row Crop Harvester assigned to the assignee of the present invention.

Co-pending application of Robert E. Martner and Carmen S. Phillips, Ser. No. 732,740 filed May 28, 1968, for Variable Spacing Row Crop Harvester, assigned to the assignee of the present invention.

PRIOR ART

U.S. Patent No. 3,365,867, Phillips, issued Jan. 30, 1968.

BACKGROUND

The invention is applied to a row crop harvester of a generally known kind, constructed for accommodating row plants. The spacing of the rows of various plants is not uniform, and they may vary throughout quite a wide range. For example, corn rows may be as closely spaced as 28 inches and as widely spaced as 42 inches and it is desired that a harvester be constructed for accommodating rows spaced within this range.

As a general rule, the plant rows of any one farmer or user are of the same spacing, i.e., the rows would not be spaced differently from one field to the next. A harvester for him then, if it is provided with means for harvesting a field of a predetermined row spacing, would generally be satisfactory, but the farmers from one to the next may have differently spaced rows. In that case it would be relatively expensive for the manufacturer to proved harvesters constructed completely differently throughout to accommodate the different spacings, but in the present case a single harvester can be provided which will accommodate the maximum variation in spacing of rows, this harvester then constituting a basic or principal machine. Then with the addition of a simple and inexpensive construction, the harvester which is constructed the full range of spacing can be adapted to an individual's particular spacing, with consequent economy in production of the equipment.

As pointed out in the prior art patent referred to above, the throats of the passages each may be 7 inches wide, the width of the two together totaling the variation in spacing referred to above, namely, fourteen inches, half of which is accommodated in each of the two passages. While the harvester as disclosed in that patent is effective for the purpose intended, there are times when the crop plants may be bunched too much at one side or the other of the passages, resulting in lesser efficiency in the cutting operation.

OBJECTS OF THE INVENTION

A broad object of the present invention is to provide a simple and inexpensive means, and one that is easily applied to the harvester, so that a basic harvester that is capable of accommodating the complete range of variation, may be easily and inexpensively adapted to a particular spacing of the rows.

Another and broad object is to provide means of the character referred to, which in one identical form is applicable to the harvester for use in the case of any row spacings within the wide range referred to.

Another object of the present invention is to provide in a harvester of the general kind referred to, guides for guiding and confining the crop plants to a certain location laterally in the wide passages, to render the cutting operation more efficient.

Still another object is to provide guides in a row crop harvester, one such guide in each of the passages referred to, and each guide having a section movable to and easily positionable in each of opposite positions or attitudes in the respective passage, to accommodate rows of different spacings.

DESCRIPTION OF A PREFERRED EMBODIMENT

In the drawings:

FIGURE 1 is an underview of the principal portion of a row harvester and showing the device of the present invention applied thereto; and FIGURE 2 is a view similar to FIGURE 1 but showing elements of the device in alternate positions.

A harvester in its entirety is indicated at 10, to which the invention is applied, this harvester being of the same construction disclosed in the pryor patent mentioned, but with changes to be referred to hereinbelow. The invention includes a pair of guides or members 12, individually identified 12a and 12b, for convenience. The harvester is adapted to move along the plant rows, in the direction indicated by the arrow 14, and includes a center gathering point 16 and side gathering dividers 18 defining passages 20, individually identified 20a and 20b for convenience.

The passages diverge rearwardly and terminate in throats 22 similarly individually identified 22a and 22b. The harvester includes a rigid frame structure 24 of suitable construction and made up of suitable elements such as angle irons, etc., defining the passages 20. Mounted in the frame are gathering chains in each passage, these including an inner chain 26, an outer chain 28 and a butt chain 30 below the outer chain 28. Mounted in each passage also are pressure straps 31 secured at their front ends to the center gathering point 16 and having their rear ends loose and detached and extending rearwardly in the passage into or beyond the throat 22. These pressure straps cooperate with the gathering chain 28 and the butt chain 30 in confining the plant stalks against those two chains and aiding the confinement of the stalks in gathering them rearwardly in the passage.

Incorporated in the harvester is a cutting means indicated generically at 32 which takes the form of a rectilinearly reciprocating sickle. This sickle includes a bar 33 driven by suitable means 34 which in turn is driven by any suitable source, such as the impelling tracktor. The sickle includes two segments 36 individually identified 36a and 36b, each segment including in this instance two full sections 38a and 38b, and a half section 40a, 40b respectively. These sections are mounted on the bar 32 and upon reciprocation of the sickle, in the usual manner, the plant stalks are cut as they pass through the throat. The sickles work against edge knives 42 mounted on suitable elements 44 of the frame in suitable locations spanning, in fore-and-aft direction, the complete range of cutting effectiveness of the sickle. At this point it is appropriate to point out a distinction of the structure of the harvester as a whole from that disclosed in the prior art patent referred to above this difference being that the ledger dividers (54) of that patent are omitted from the present construction.

The guides 12 are identical, and they remain bodily in place within the respective passages, although sections of those guides are movable to each of opposite positions. A description of the detail construction of one of the guides will suffice for both. Referring for example to the guide 12b of FIGURE 1, the guide includes a mounting plate 46 which is suitably secured to an element 48 of the frame, which is in the form of a flat plate at the rear portion of the frame, and suitably secured to the plate 46 is a forwardly extending arm 50. The plate 46 and arm 50 form what may be termed a first or rear section of the guide which remains in fixed position on the frame, although detachably mounted thereon. The arm 50 extends forwardly on a line approximating a center line of the passage. A second arm or link 52 is pivotally mounted at 54 on the first arm and extends generally forwardly in the passage and is movable between opposite positions shown in FIGURE 1, these opposite positions being referred to again hereinbelow. The forward end of the arm 50 is detachably secured as at 55 to the fixed frame element 44 on the respective side of the passage, there being one such frame element on each side of each passage.

On the rear end of the arm 52 is a member 58 which may be in the form of a plate and is rigidly secured to that arm as by welding. The plate may have any of various shapes, and as here shown has a rear portion 58a tapered rearwardly to form rearwardly converging knife edges or cutting edges 60 individually identified 60a and 60b. The arm 50 and member 58 may be referred to as a second or front section 62.

A guide 12 is positioned in each of the passages in the manner described, the first sections thereof being rigidly secured and normally fixed in place. Assuming a narrow spacing of crop rows, the guides 12 are positioned as represented in FIGURE 1, i.e., with the forward ends of the forward sections 62 thrown outwardly. As the harvester moves along the rows, the plants are positioned at or adjacent the inner sides of the passages. The knife edges 60a are directed toward and opposed to the edge knives 42 in a rearwardly converging angle, and as the sickle reciprocates, it works against the cutting edges 60a and the opposed edge knives 42 and thus efficiently perform their cutting operation. The guides 12 in the present instance in the case of narrow spacing of rows, confine the plants toward the inner sides of the passages, preventing the random or uncontrolled movements of the crop plants, or any elements thereof, toward the outer sides of the passages. Thus in the situation assumed in connection with FIGURE 1, a user or farmer having narrow spacing of plant rows, the crop plants are cut easily and efficiently.

Assuming in another case, widely spaced rows, the guides 12 are positioned as represented in FIGURE 2, namely with the forward ends of the front sections thrown inwardly and secured to the corresponding frame elements 44. In such position of the forward sections of the guides, the opposite knife edges 60b are directed toward and opposed to the outer edge knives 42 and form channels for receiving the crop plants similarly to that referred to above, namely, the cutting edges 60b form a rearwardly diverging angle with the opposed edge knives 42, and those opposed edge knives provide cutting and reacting surfaces against the sickle.

In each of the cases represented in FIGURES 1 and 2 the crop plants are guided and confined to the respective sides of the passages and as so confined cut, and prevented from drifting or being shifted from one to the other side of the passage, eliminating possible bunching or matting at the sides.

The guides 12 are particularly effective in that they can remain bodily in position in the respective passages, and the different spacings of rows can be accommodated by merely shifting and re-positioning the forward sections thereof, without removing the complete guides from the passages in which they were originally located.

What is claimed is:

1. A row crop harvester of the type having a plurality of sets of gathering points defining passages therebetween for receiving the crop plants of a corresponding number of rows respectively, the passages each being of substantial width for receiving the plants notwithstanding variation in spacing between the rows, means in each passage for cutting the plants in that passage, guide means in each passage, each including a mounting section fixed in position and a forward section movable between opposite positions respectively adjacent opposite sides of the passage for guiding and confining the crop plants to corresponding lateral positions adjacent the respective sides of the passage.

2. A harvester according to claim 1, and including a framework, and the forward sections defining, with opposed gathering points, rearwardly converging paths within the passages through which the plants move.

3. A harvester according to claim 2, wherein the forward sections are pivotally mounted on the mounting sections, and the forward sections have rear portions extending rearwardly beyond the pivot axes to provide guiding and confining functions rearwardly beyond those axes.

4. A harvester according to claim 2, wherein the guide means are provided with generally fore-and-aft extending knives cooperating with said cutting means for cutting the crop plants.

5. A harvester according to claim 4, wherein edge knives are provided on said framework opposed to the knives on the guide means, and all of the knives cooperate with said cutting means for cutting the plants.

6. A harvester according to claim 1, and including a framework having a rear transversely extending section, the mounting section of each guide means including a rear mounting plate secured to said rear element and a first arm extending forwardly adjacent the fore-and-aft median line of the passage, and the forward section including a second arm pivotally mounted on the first arm.

7. A harvester according to claim 6, wherein the second arm is pivotally connected to the first arm and includes a plate member secured to its rear end and extending rearwardly beyond its pivot axis, the plate member includes a knife element on each of the lateral edges thereof extending rearwardly beyond the pivot axis, an edge knife is mounted on each of the frame elements on opposite sides of each passage, and in each of opposite positions of the forward sections, the respective knife elements are opposed to corresponding edge knives on the elements of the framework, and the corresponding knife elements and the opposed edge knives form rearwardly diverging paths within the passages extending rearwardly at least as far as the cutting range of the cutting means.

8. A harvester according to claim 1, wherein the cutting means are fixed in position in the harvester relative to the two passages, the cutting means include elements operatively associated with the respective passages, and the forward sections of the guide means are moved to their opposite positions independently of the cutting means.

9. A harvester according to claim 1, wherein the harvester includes a fixed framework with frame elements an opposite sides of the passages, the cutting means is a sickle member rectilinearly reciprocable in transverse directions, the mounting section of the guide means having an arm extending forwardly adjacent the median line of the passage, the cutting means being individually related to the respective passages, the forward sections of the guide means being movable to opposite positions independently of the cutting means, and the forward sections and the opposed sides of the passages forming paths in the passages extending rearwardly beyond the cutting range of the cutting means.

10. A harvester according to claim 1, wherein the passages converge rearwardly and merge into throats of lesser but substantial widths, and including a framework incorporating fixed elements defining with said gathering points said passages and throats, the framework also including a rear element in the form of a relatively flat horizontal deck, the cutting means being in the form of a sickle at the rear of the throats and reciprocable transversely, the guide means each including a rear section having a plate element secured to the rear element of the framework and an arm extending forwardly adjacent the fore-and-aft longitudinal line of the passage, and a forward section including an arm pivoted on the first arm and including a plate element secured to the rear end thereof, the forward section being swingable on its pivot axis between opposite positions in each of which its forward end is connectable with a corresponding framework element on the respective side of the passage, and on its rear end including a plate element having rearwardly converging edges forming lateral knife elements, the structure also including edge knives on the side elements of the passages opposed to the knife elements on the plate element, and in each position of the forward section the knife edges on the rear plate element, and the respective edge knives on the elements of the framework, forming converging paths in the respective passages extending rearwardly beyond the cutting range of the cutting means.

References Cited

UNITED STATES PATENTS

| | | | |
|---|---|---|---|
| Re. 24,565 | 11/1958 | Wigham | 56—98 |
| 1,491,069 | 4/1924 | Scranton | 56—102 |
| 2,783,603 | 3/1957 | Smith et al. | 56—98 XR |
| 2,970,420 | 2/1961 | Schmidt | 56—98 |
| 2,984,962 | 5/1961 | Heising | 56—102 |
| 3,213,597 | 10/1965 | Procter | 56—102 XR |
| 3,365,867 | 1/1968 | Phillips | 56—53 |

LOUIS G. MANCENE, Primary Examiner

JAMES A. OLIFF, Assistant Examiner

U.S. Cl. X.R.

56—106